United States Patent
Moogala et al.

(10) Patent No.: US 7,546,631 B1
(45) Date of Patent: Jun. 9, 2009

(54) EMBEDDED MANAGEMENT SYSTEM FOR A PHYSICAL DEVICE HAVING VIRTUAL ELEMENTS

(75) Inventors: Venu G. Moogala, Marlborough, MA (US); Timothy J. Knight, Shrewsbury, MA (US); Darren J. Hayduk, Wilmington, MA (US); David A. Choiniere, Attleborough, MA (US); Mark E. Pawela, Hopkinton, MA (US); Eric Carbonneau, Lancaster, MA (US); Paul Phillips, Westboro, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 580 days.

(21) Appl. No.: 10/835,917

(22) Filed: Apr. 30, 2004

(51) Int. Cl.
*H04L 9/32* (2006.01)
(52) U.S. Cl. .............. 726/2; 713/153; 711/206
(58) Field of Classification Search .......... 726/2; 713/153; 711/206
See application file for complete search history.

(56) References Cited

U.S. PATENT DOCUMENTS

| | | | | |
|---|---|---|---|---|
| 5,935,209 | A * | 8/1999 | Budhraja et al. | 709/223 |
| 5,974,502 | A * | 10/1999 | DeKoning et al. | 711/114 |
| 6,529,985 | B1 * | 3/2003 | Deianov et al. | 710/260 |
| 6,560,613 | B1 * | 5/2003 | Gylfason et al. | 707/200 |
| 6,618,736 | B1 * | 9/2003 | Menage | 707/204 |
| 6,711,607 | B1 * | 3/2004 | Goyal | 709/203 |
| 6,732,211 | B1 * | 5/2004 | Goyal et al. | 710/261 |
| 6,754,716 | B1 * | 6/2004 | Sharma et al. | 709/238 |
| 6,877,044 | B2 * | 4/2005 | Lo et al. | 710/2 |
| 6,880,002 | B2 * | 4/2005 | Hirschfeld et al. | 709/223 |
| 6,898,670 | B2 * | 5/2005 | Nahum | 711/114 |
| 6,907,421 | B1 * | 6/2005 | Keshav et al. | 707/2 |
| 6,909,691 | B1 * | 6/2005 | Goyal et al. | 370/230 |
| 6,948,003 | B1 * | 9/2005 | Newman et al. | 709/250 |
| 6,948,044 | B1 * | 9/2005 | Chandrasekaran | 711/203 |
| 6,976,258 | B1 * | 12/2005 | Goyal et al. | 718/104 |
| 6,985,937 | B1 * | 1/2006 | Keshav et al. | 709/223 |
| 7,020,734 | B2 * | 3/2006 | Mimatsu et al. | 710/311 |
| 7,028,158 | B1 * | 4/2006 | Beatty et al. | 711/202 |
| 7,043,614 | B2 * | 5/2006 | Umbehocker et al. | 711/162 |
| 7,051,167 | B2 * | 5/2006 | Ito et al. | 711/152 |

(Continued)

OTHER PUBLICATIONS

Lovelace, Mary, Introduction to IBM TotalStorage Multiple Device Manager, IBM Redbooks, 2003.*

(Continued)

*Primary Examiner*—David García Cervetti
(74) *Attorney, Agent, or Firm*—Brooks Kushman P.C.

(57) ABSTRACT

A single management facility in a virtualized system that facilitates the presentation of either a virtual element view or system view to a network management user depending upon the user's access rights is disclosed. The view presented to the user is modified based on the scope and type of access rights, which are found in a profile object, that is stored in an environmental object, established during the user login. Each virtualized element in the system includes management information that is associated with the virtual element via a virtual identifier. The management information indicates the level of the user access rights necessary to view the associated virtual element. Requests by a user to access management information associated with a virtual element are analyzed to determine if the access rights specified in the user profile enable the user to access the information associated with the virtual element.

19 Claims, 7 Drawing Sheets

System View

U.S. PATENT DOCUMENTS

| | | | |
|---|---|---|---|
| 7,080,229 B2 * | 7/2006 | Manbert et al. | 711/170 |
| 7,082,464 B2 * | 7/2006 | Hasan et al. | 709/223 |
| 7,093,038 B2 * | 8/2006 | Ghosh et al. | 710/62 |
| 7,127,558 B2 * | 10/2006 | Honda et al. | 711/114 |
| 7,133,988 B2 * | 11/2006 | Fujibayashi | 711/162 |
| 7,143,024 B1 * | 11/2006 | Goyal et al. | 703/21 |
| 7,194,538 B1 * | 3/2007 | Rabe et al. | 709/224 |
| 7,219,354 B1 * | 5/2007 | Huang et al. | 719/328 |
| 7,222,172 B2 * | 5/2007 | Arakawa et al. | 709/224 |
| 2002/0156987 A1 * | 10/2002 | Gajjar et al. | 711/203 |
| 2003/0028624 A1 * | 2/2003 | Hasan et al. | 709/220 |
| 2003/0033387 A1 * | 2/2003 | Adams et al. | 709/220 |
| 2003/0051021 A1 * | 3/2003 | Hirschfeld et al. | 709/223 |
| 2003/0149848 A1 * | 8/2003 | Ibrahim et al. | 711/154 |
| 2003/0204597 A1 * | 10/2003 | Arakawa et al. | 709/226 |
| 2003/0233494 A1 * | 12/2003 | Ghosh et al. | 710/1 |
| 2003/0233510 A1 * | 12/2003 | Umbehocker et al. | 711/100 |
| 2003/0236945 A1 * | 12/2003 | Nahum | 711/114 |
| 2004/0010666 A1 * | 1/2004 | Umbehocker et al. | 711/156 |
| 2004/0078293 A1 * | 4/2004 | Iverson et al. | 705/27 |
| 2004/0205143 A1 * | 10/2004 | Uemura | 709/208 |
| 2004/0225719 A1 * | 11/2004 | Kisley et al. | 709/212 |
| 2005/0120160 A1 * | 6/2005 | Plouffe et al. | 711/1 |
| 2005/0210098 A1 * | 9/2005 | Nakamichi et al. | 709/203 |
| 2005/0267986 A1 * | 12/2005 | Murakami et al. | 709/238 |
| 2005/0276092 A1 * | 12/2005 | Hansen et al. | 365/149 |
| 2006/0155398 A1 * | 7/2006 | Hoffberg et al. | 700/86 |
| 2007/0112574 A1 * | 5/2007 | Greene | 705/1 |
| 2007/0174583 A1 * | 7/2007 | Shinkai et al. | 711/203 |

OTHER PUBLICATIONS

Brocade, The essential elements of a storage networking architecture, Brocade, 2001.*

Veritas, The Architecture of Veritas SANPoint Control 2.0, Veritas, Mar. 2001.*

Veritas, Storage Virtualization, Veritas, Apr. 2001.*

Sun Microsystems, Solaris™ Containers—How Advances in Server Virtualization Will Simplify Service Manageability, Feb. 2002, Sun Microsystems.*

* cited by examiner

Fig. 1 - Prior Art

EMBEDDED MANAGEMENT SYSTEM FOR A PHYSICAL DEVICE HAVING VIRTUAL ELEMENTS

FIELD OF THE INVENTION

The illustrative embodiment of the present invention relates generally to a physical device having virtual elements and more particularly to an embedded management system for managing the physical device and the virtual elements within the physical device.

BACKGROUND

FIG. 1 shows an example of a traditional configuration for users to manage access to servers and storage via network devices such as a switch in a data center. In this example, clients 11A, 11B and 11C wish to gain access to services provided by respective groups of resources 14A, 14B and 14C in the data center. Each of the groups of resources 14A, 14B and 14C includes servers and storage. Thus, servers 16A and storage 18A are part of group 14A, servers 16B and storage 18B are part of group 14B, and servers 16C and storage 18C are part of group 14C. A separate network device 12A, 12B and 12C is associated with each group 14A, 14B and 14C and controls the flow of service requests and responses for the associated group. Each network device 12A, 12B and 12C is a separate self-contained physical device and facilitates a client's access to the resources in the respective group for a user. Each physical device also has an independent network management interface that provides a network management user 10A, 10B and 10C with a system view to manage the device. It should be noted that the term "user" appearing herein is used interchangeably with the term "network management user".

This approach requires separate network devices 12A, 12B and 12C for each of the logical groups 14A, 14B and 14C. These network devices 12A, 12B and 12C can be quite costly and can present various configuration challenges, especially if they are distinct types of devices.

One possible solution to this problem is virtualization. Virtualization allows a single physical device to be logically partitioned so as to function as if it were multiple devices. Virtualization allows partitioning of a device's resources but also presents management challenges. One such management challenge is to present a management view that is akin to that used for managing an independent physical device. In other words, the challenge is to present to the network management user a management view so that the user experiences each virtual element as if it were a physical device and also present a non-virtualized system view for the administrator/owner of the physical device

SUMMARY OF THE INVENTION

The illustrative embodiment of the present invention provides a management facility that facilitates the presentation of either a virtual element view or system view to a network management user depending upon the user's access rights. The user interface presented is modified based on the scope and type of access rights of the network management user. The scope and type of access privileges afforded to the user of the virtualized system is defined by a profile object which indicates the scope and type of user access. A profile object is associated with the user during log-in. Each virtualized element in the physical device is uniquely distinguishable by an identifier. The management information associated with a virtual element is indicated by its virtual element identifier. An environment object is created for each user at login to store the profile object and the virtual element identifier. The virtual element identifier indicates the type and scope of the user access privileges necessary to manage the associated virtual element. Requests by a user to access management information associated with a virtual element are analyzed to determine if the access privileges specified in the user profile enable the user to access the virtual element and if so to perform the type of operation requested.

In one embodiment, a physical device apparatus in a network includes multiple virtual elements configured on the physical device. Each collection of management information is associated with a virtual element. The collection of management information includes an access scope indicating a required user access level needed to access the information. The physical device apparatus also includes at least one environment object associated with a user interfaced with the device. The environment object includes a collection of user profile information and the identifier of the virtual element the user is authorized to access. The physical device apparatus further includes a management facility that controls the access of a user to a collection of management information associated with one of the virtual elements.

In another embodiment in a network, a method of controlling access to a plurality of virtual elements includes the step of providing a physical device with multiple virtual elements configured thereon. Each collection of management information is associated with a virtual element. The collection of management information includes an access scope indicating a required user access level needed to access the information. The method further includes instantiating an environment object associated with a user interfaced with the device. The environment object includes a collection of user profile information associated with the user and the identifier of the virtual switch for which the user is authorized. The method also requests access for a user to a collection of the management information for a virtual element and determines whether to grant the request based on the user profile information and the collection of management information.

DETAILED DESCRIPTION

The illustrative embodiment of present invention provides a management facility for managing a physical device that is partitioned into multiple virtual elements. Each virtual element represents a logical partition of the resources of the physical device and, in general, operates as if it were a distinct physical device. The management facility provides management of resources on a system-wide basis as well as management on a per virtual element basis. Management information for each virtual element is tagged with an identifier that associates the management information with the virtual element. The management facility provides scoping to appropriately limit the scope of management information that may be accessed by a user. Thus, for example, a user that should only have access to management information for a specific virtual element is only permitted access to the management information for the specified virtual element. In contrast, a user that has system-wide privileges is permitted to access all of the management information, including both management information for the virtual elements and management information for the system. An interface is presented to the user that is scoped based on access rights and retains the look and feel of conventional interfaces to physical devices.

In the illustrated embodiment, the management information is also accessible via SNMP (Simple Network Management Protocol). Thus, the management information may be described in Management Information Bases (MIBs). The management information is organized into a group of scalar and table objects. The MIBs may be created automatically, partially or wholly, from the application data and commands that are stored in a predefined configuration file format (as will be described in more detail below). In one embodiment, the application data and commands are stored in an XML (Extensible Markup Language) format that is transformed into MIBs. The application data and commands may also be transformed to generate documentation, such as documentation for Command Line Interface (CLI) commands. Still further, the application data commands may be transformed into a Simple Management Framework (SMF) text file or other proprietary or well-known formats that may be used by management applications.

The illustrative embodiment of the present invention employs a number of profiles that define access privileges (i.e. read-only, read-write, no access privileges, or a combination thereof) for users and the scopes to which users are limited (i.e. limits to a particular virtual element or to the entire system). Each user has an associated profile stored in an environment object. A number of different profiles may be provided by the management facility, and the profiles are dynamic in that they may be modified, added (i.e. new profiles defined), or deleted. The identity of the virtual element that the user wishes to access is also stored in the environment object.

Figure 1:
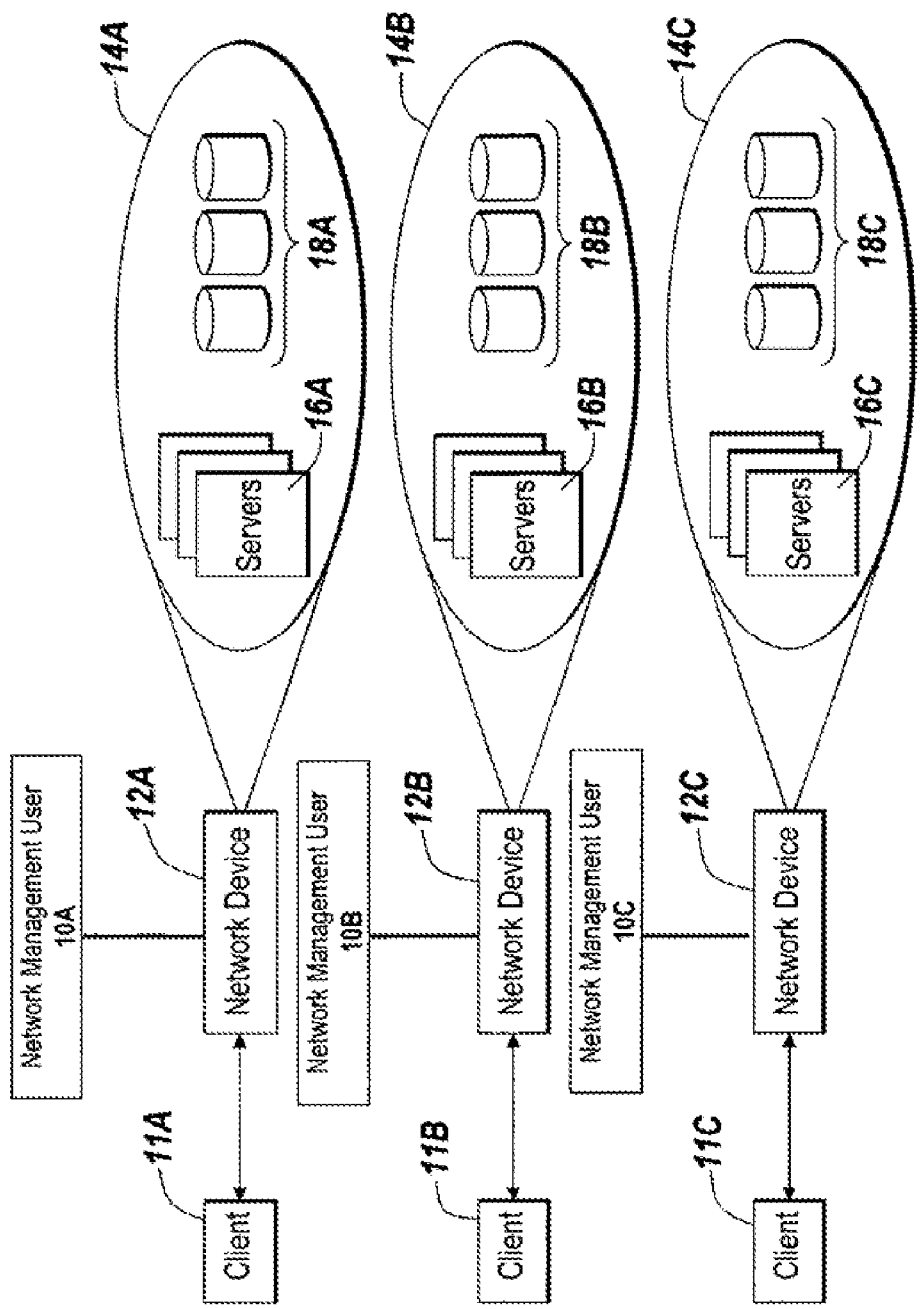
FIG. 1 (Prior art) depicts an example of a conventional configuration for a data center wherein multiple network devices are employed.
Figure 2:
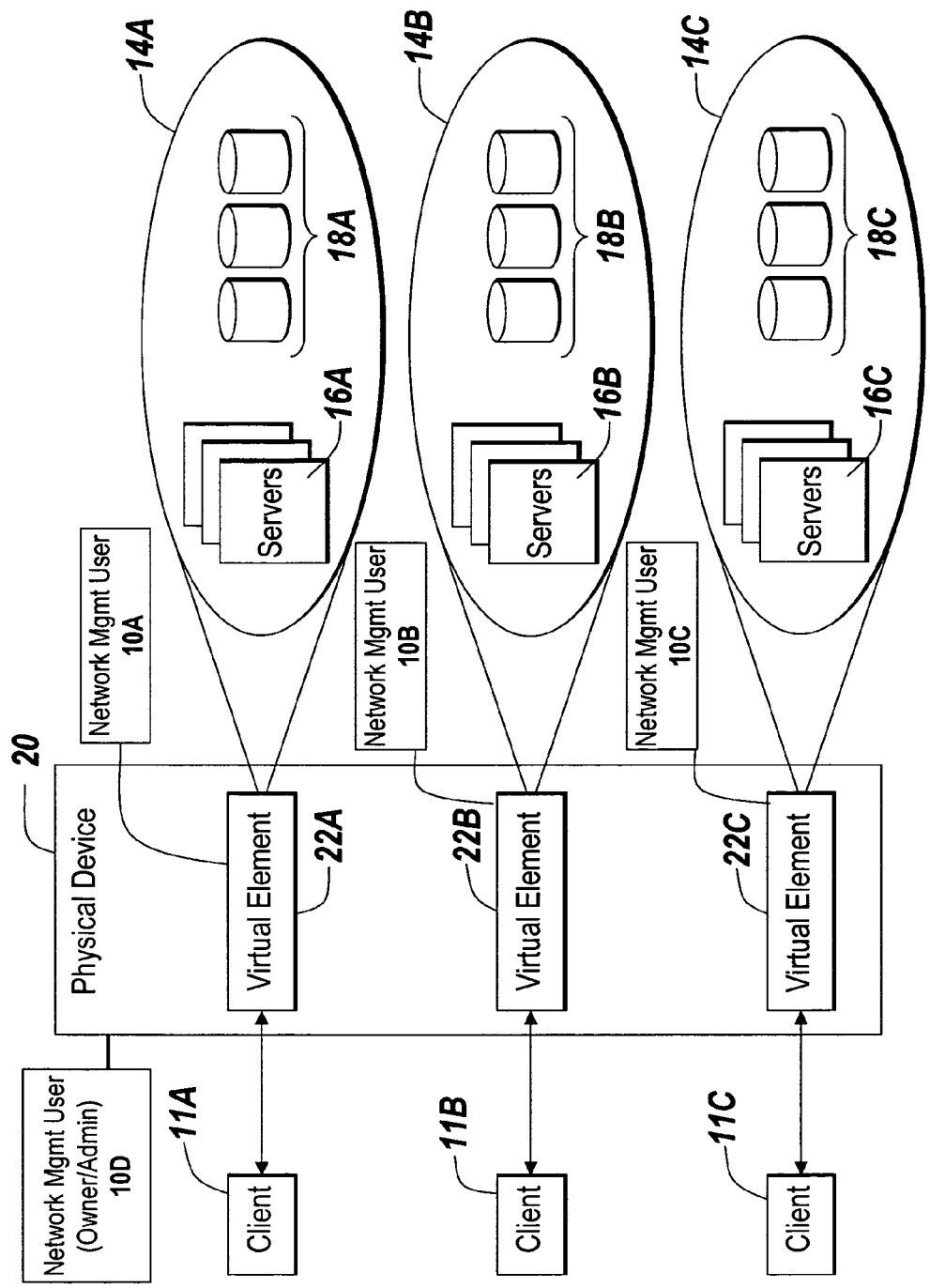
FIG. 2 depicts an example of a configuration for a data center in accordance with the illustrative embodiment of the present invention.

FIG. 2 shows an example configuration wherein a physical device 20 is used in the illustrative embodiment of the present invention. It should be noted that the configuration shown in FIG. 2 differs from that shown in FIG. 1 in that the separate network devices 12A, 12B and 12C are replaced with a single physical device 20 in FIG. 2. The single physical device 20 includes virtual elements 22A, 22B and 22C. These virtual elements act as separate virtual devices for directing communications between the clients 11A, 11B and 11C and the respective resource groups 14A, 14B and 14C. The network management users 10A, 10B and 10C are presented with a management view that is consistent with the interface presented by the separate physical devices although they are only viewing and managing their respective virtual elements. A network management user 10D with administrator privileges is presented with a view of the entire physical device 20.

It should be appreciated that the virtual elements may take many forms. For example the virtual elements may be virtual switches that are partitions of a physical switch or a server whose resources are partitioned into multiple virtual servers. In addition, the virtual elements may be virtual routers as opposed to virtual switches. Those skilled in the art will appreciate that the present invention is not limited to virtual elements that are either virtual switches or virtual routers; rather the present invention may be practiced with other varieties of virtual elements that constitute logical partitions of the resources of a physical device.

Figure 3:
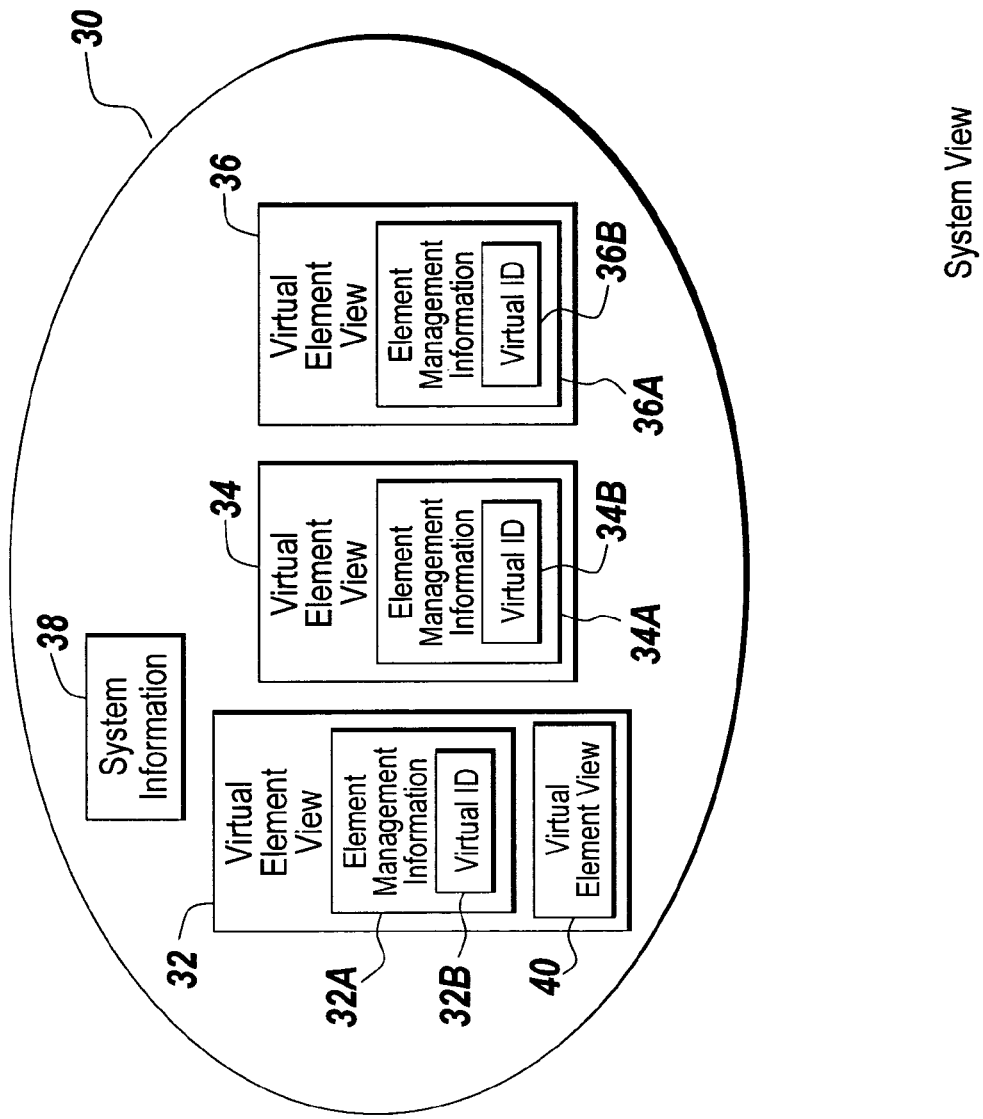
FIG. 3 provides a logical view of the scoping provided in the illustrative embodiment of the present invention.

FIG. 3 depicts an example of the scoping that may be provided by the illustrative embodiment of the present invention. System view 30 encompasses management information 32A, 34A and 36A for each of the virtual elements views 32, 34 and 36 as well as system management information 38 (i.e. non-virtualized attributes). Each virtual element view 32, 34 and 36 contains management information 32A, 34A and 36A that is particular to a given virtual element 32, 34 and 36. The management information 32A, 34A and 36A in these virtual element views 32, 34 and 36 has been tagged with a virtual element identifier 32B, 34B and 36B to designate the information as belonging to the associated virtual element views and may be further embedded as shown in FIG. 3. For example, virtual element view 40 is a subset of virtual element view 32 and contains information for a virtual element that is contained in another virtual element. For instance, the virtual element view 32 may contain management information that is associated with a specific virtual switch, and the virtual switch may include a virtual router. The virtual element view 40 is associated with the virtual router.

Figure 4:
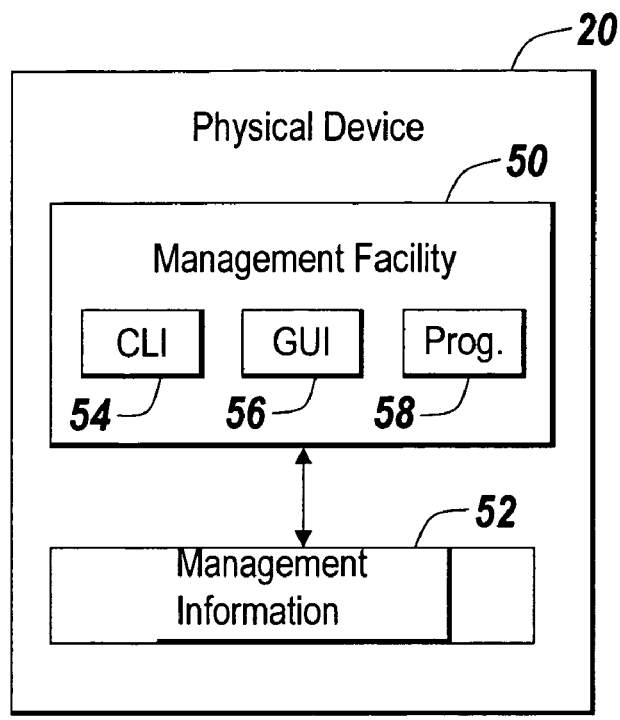
FIG. 4 illustrates a number of the components, including the management facility and MIBs, found in a physical device used by the illustrative embodiment of the present invention.

FIG. 4 depicts the management facility 50 used by the illustrative embodiment of the present invention in greater detail. A physical device 20 includes a management facility 50 and is able to manage resources on both a per virtual element basis as well as on a system-wide basis. Users may interact with the management facility 50 via user interfaces such as a Command Line Interface (CLI) 54 or a Graphical User Interface (GUI) 56. The management facility 50 also supports programmatic interfaces 58 such as SNMP and XML where requests are received programmatically. Those skilled in the art will recognize that additional types of interfaces may be deployed without departing from the scope of the present invention.

Figure 5:
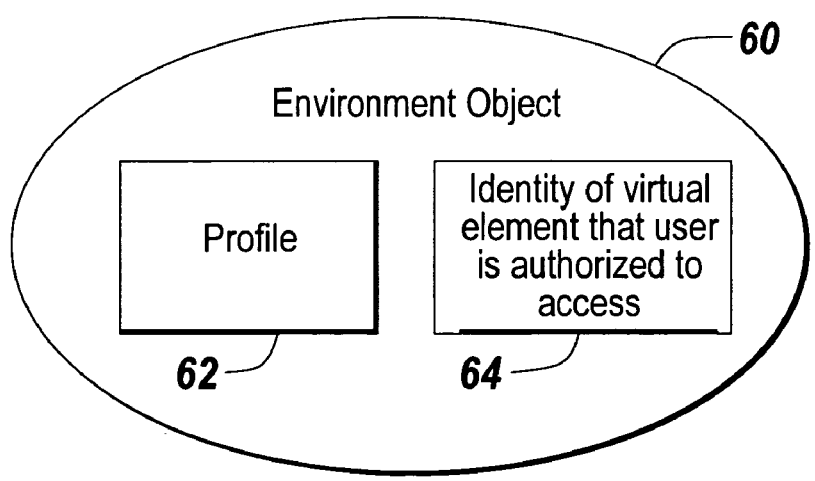
FIG. 5 depicts an example of an environment object used in the illustrative embodiment of the present invention.

When a user seeks to access management information 52 via one of these interfaces 54, 56 and 58, the management facility 50 must determine whether the user is permitted the requested access. The management facility 50 maintains an environment object 60 (depicted in FIG. 5) for each user in the illustrative embodiment. The environment object includes a user profile 62. The environment object 60 also includes the identities of the virtual element(s) that the user is authorized to access 64.

As was mentioned above, user profiles identify the type of access that is permitted to the user and the scope of access that is permitted to a user. The following table identifies an example of some of the user profiles and associated access rights and scopes that are associated with the user profile.

| User Profile | Privileges |
|---|---|
| SystemAdmin | Read and write access for all settings for the system, including all virtual elements |
| SystemOperator | Read-only access for all settings for the system, including all virtual elements |
| VirtualElementAdmin | Read and write access for all settings that affect a specific virtual element |
| VirtualElementOperator | Read-only access to all settings that affect a specific virtual element |

It should be appreciated that the user profiles are extensible and modifiable. New user profiles may be created and user profiles may be deleted. In addition, user profiles may be modified as needed. Thus, the user profiles are dynamic.

Those skilled in the art will appreciate that the use of the environment object is not necessary to practice the present invention. In alternative implementations, the profile information and identity of the virtual elements that the user seeks to access may be stored separately and in different formats. The environment object constitutes only an exemplary implementation.

Figure 6:
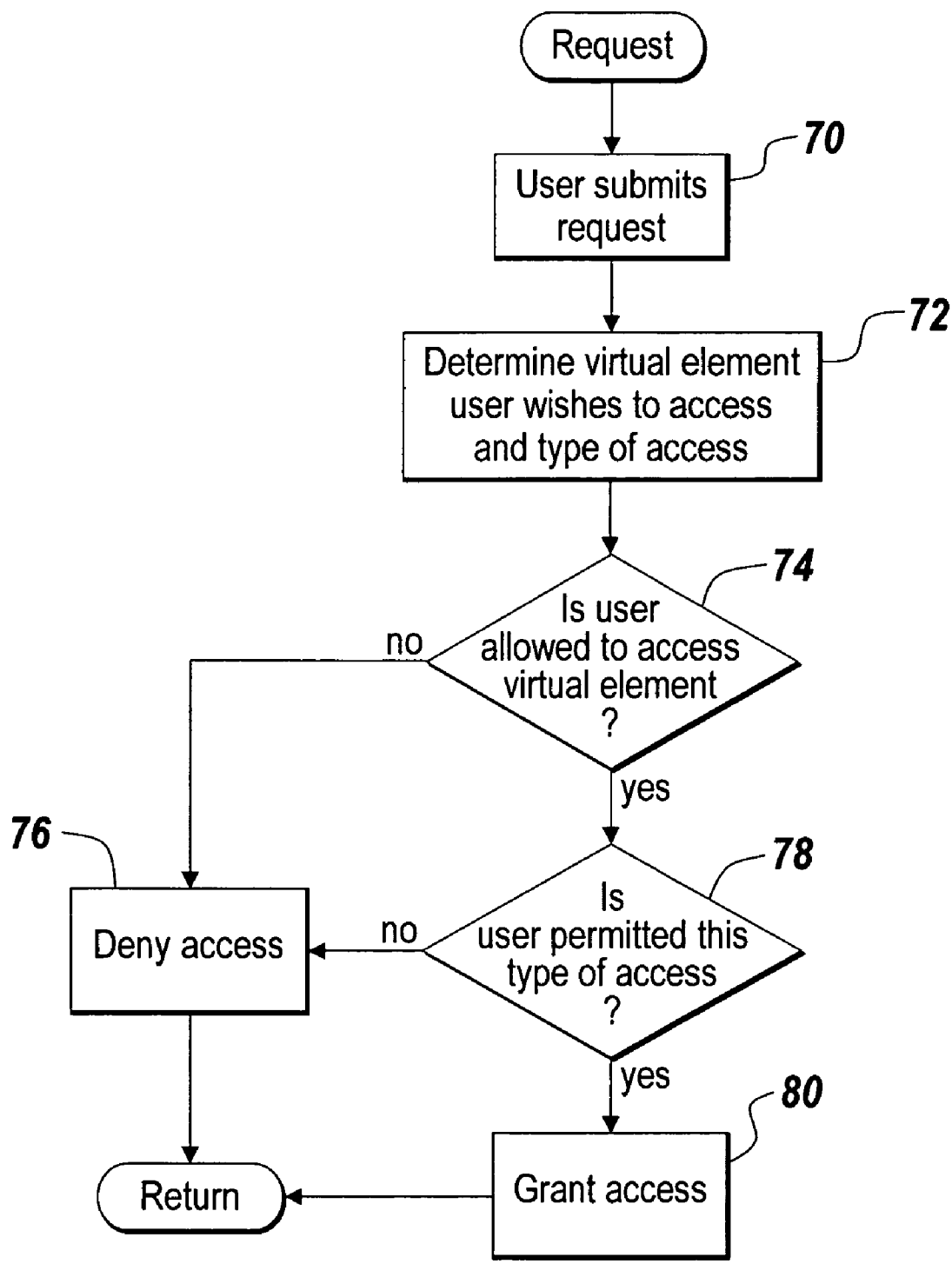
FIG. 6 is a flow chart illustrating the steps that are performed in the illustrative embodiment of the present invention when a request of the management facility is received.

FIG. 6 is a flow chart illustrating the steps that are performed when a user submits a management request to the management facility 50 that requires access to management information 52. Initially, the user submits the request (Step 70). The user may submit the request via CLI 54, via GUI 56 or via programmatic interface 58. The management facility 50 examines the request and determines the virtual element that the user wishes to access and the type of access required for the request (Step 72). A check is made to determine whether the user is permitted to access the identified virtual element (Step 74). If the user is not permitted, then access to the associated management information is denied by refusing to perform the request (Step 76). If the user is permitted to access the identified virtual element, a check is made whether the user is permitted the type of access that is requested (i.e., read access, write access, etc.) (Step 78). If the user is permitted the type of access, then access is granted (Step 80) and the request is acted upon within the scope of the virtual element. If, however, the user is not permitted the type of access, the request is denied (Step 76).

Figure 7:
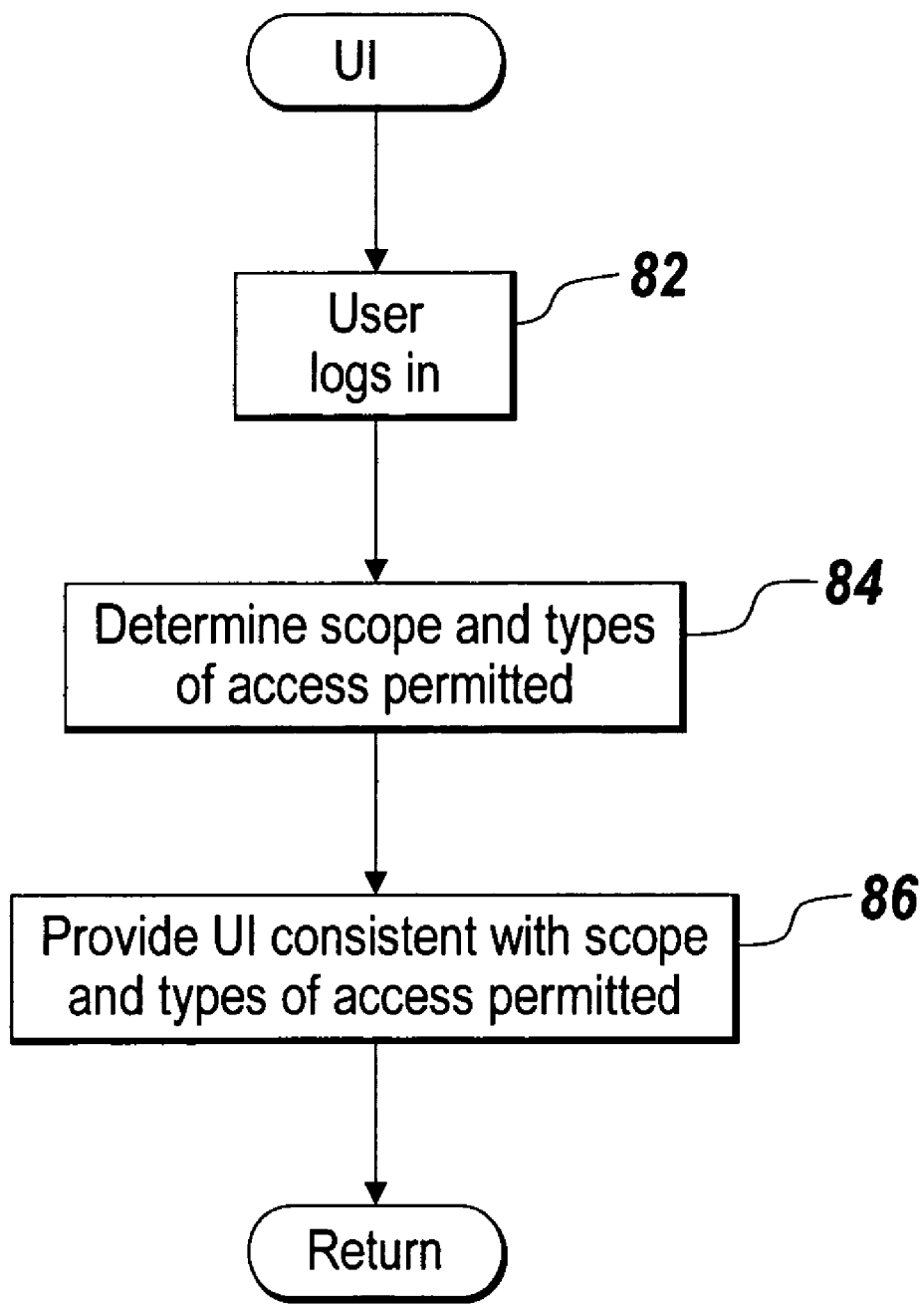
FIG. 7 is a flow chart illustrating the steps that are performed to determine what is depicted on a user interface of the management facility.

The management facility 50 also provides some additional help when the user interface 54 or 56 advertises/indicates actions that are consistent with the scope of the granted user access. The management facility 50 only displays options on the UI that are consistent with the type of access and the scope of access for which the user is authorized. FIG. 7 is a flow chart illustrating the steps that are performed in customizing the UI to facilitate the display of only authorized options. The process begins when the user logs into the UI (step 82). This may entail accessing a web browser via a web browser and typing in a user ID and password. A determination is then made of a scope and type of access that is permitted for the user (Step 84). The user interface is then customized to only display options that are available which are consistent with the scope and type of access that are permitted for the user (Step 86).

Although the examples contained herein have discussed the use of the management facility in contact with a plurality of virtual elements, it should be understood that the illustrative embodiment of the present invention might also be applied to other forms of virtualization for electronic devices. The illustrated embodiment of the present invention may be extended to include any virtual software entity created on a physical device that needs to be contacted through a management system.

Figure 8:
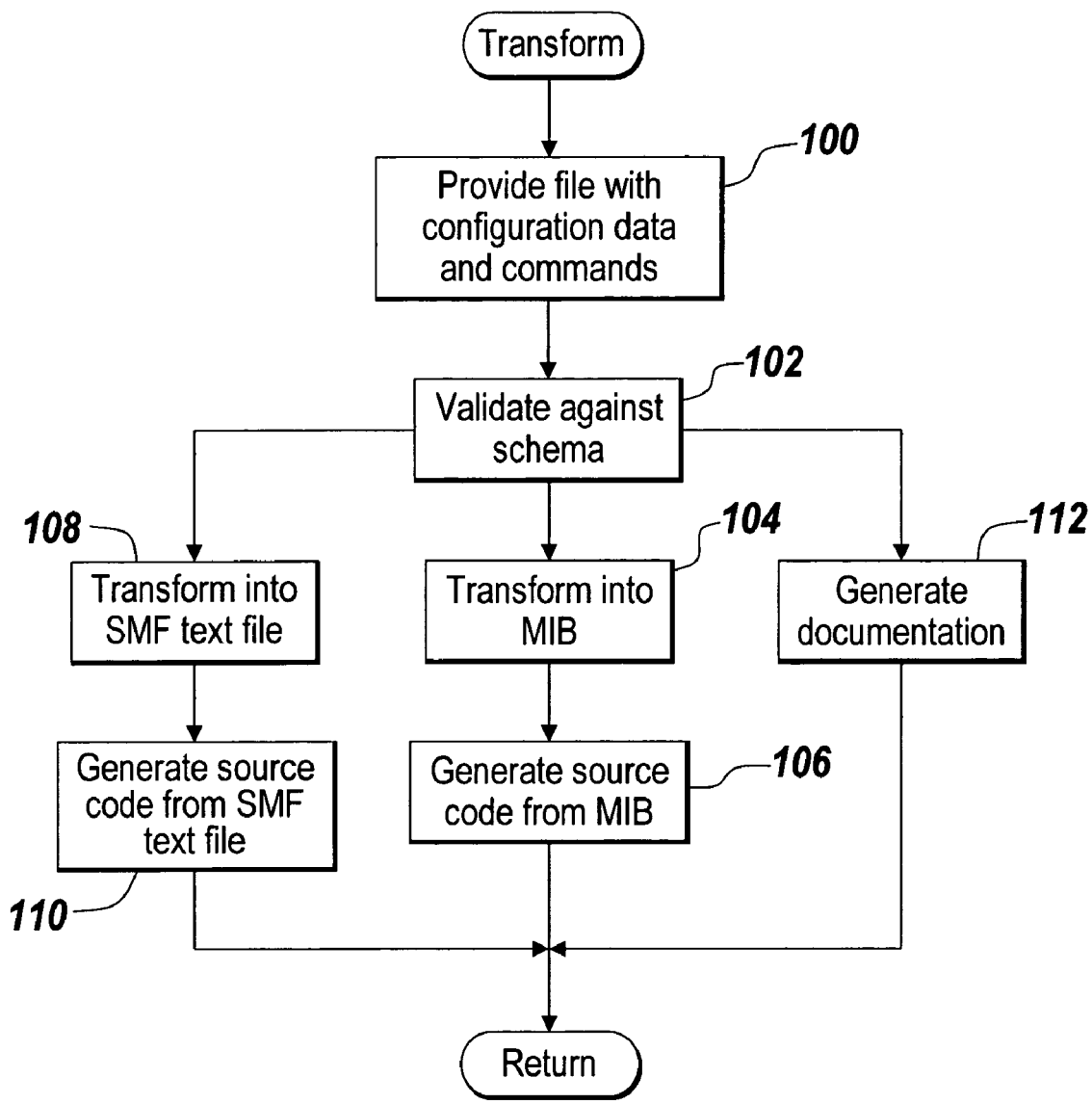
FIG. 8 is a flow chart illustrating the steps that are performed to transform content contained in an XML (Extensible Markup Language) management schema file.

The illustrative embodiment of the present invention provides the capability of taking management data in a specified file format and transforming it to generate MIBS. FIG. 8 provides an example of the steps that are performed to transform the management data. Initially, a file is provided that contains management data and commands (Step 100). The file is then validated against schema by applying an XML style sheet (Step 102). Once the syntax and contents have been validated, the XML document is transformed into one or more MIBs (Step 104). A number of conventionally available tools may be employed to perform this transformation. In addition, source code may be generated from the MIB (Step 106). The source code is used to fill in data structures for use in a SNMP agent in the management facility 50.

The data commands in the file holding the management data may also be transformed to generate an SMF text file (step 108). The SMF text file created in step 108 then may be passed through a code generator to generate source code in C++ or another language (Step 110). This source code fills in data structures for use in the management facility 50. In particular, it fills in values that are used by the CLI, the web interface and the XML interface. This enables the values to be put in a form that can be used by the programmatic and presentation interfaces.

The management data and commands may also be used to generate documentation for the CLI commands and to generally provide online help (Step 112).

Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequences of steps discussed herein are examples and not the exclusive sequence of steps possible within the scope of the present invention.

We claim:

1. A physical device apparatus in a network, comprising:
a plurality of virtual elements configured on said physical device, each said virtual element associated with a collection of management information for said virtual element, said collection of management information including an access scope indicating a required user access level needed to access said information, wherein said collection of management information is associated with a virtual element identifier and said virtual elements direct communication between clients and resource groups;
at least one environment object associated with a user interfaced with said device, said environment object including a collection of user profile information; and
a management facility, said management facility controlling the access of a user to a collection of management information associated with at least one of said virtual elements, wherein the management facility provides a view of a first virtual element from the plurality of virtual elements to a user, the view of the first virtual element containing an embedded view of a second virtual element, the second virtual element associated with the first virtual element, and wherein the collection of management information for the first virtual element is tagged with a virtual element identifier to associate that collection of management information with the first virtual element, and wherein the collection of management information for the second virtual element is tagged with a first virtual element identifier and a second virtual element identifier to associate that collection of management information with the first virtual element and the second virtual element, such that the collection of management information for the second virtual element is able to be viewed from the view of the first virtual element and the embedded view of the second virtual element.

2. The apparatus of claim 1 wherein said management facility provides one of a system view and virtual element view to a user based on said user profile, said system view including a view of plurality of said virtual elements.

3. The apparatus of claim 1, comprising further:
a user interface, said user interface modified based on the scope and type of access privileges accorded to said user.

4. The apparatus of claim 1 wherein access to said management information is scoped based upon the access privileges accorded a user.

5. The apparatus of claim 1 wherein said collection of user profile information defines the type of access privileges of said user.

6. The apparatus of claim 1 wherein said collection of user profile information defines the scope of access privileges of said user.

7. The apparatus of claim 6 wherein said scope of access privileges of the user is set to one of a specified virtual element, a subset of virtual elements and unlimited access to management information for all of said virtual elements on said physical device.

8. The apparatus of claim 1 further comprising:
a schema for management data and commands stored in an XML (Extensible Markup Language) file.

9. The apparatus of claim 8 wherein data in said XML file is used to create one of a MIB (Management Information Base) file and SMF (Simple Management Framework) file.

10. In a network, a method of controlling access to a plurality of virtual elements, said method comprising:
providing a physical device with a plurality of virtual elements configured thereon, each said virtual element associated with a collection of management information for said virtual element, said collection of management information including an access scope indicating a required user access level needed to access said information, wherein said collection of management information is associated with a virtual element identifier and said virtual elements direct communication between clients and resource groups;
instantiating an environment object associated with a user interfaced with said device, said environment object including a collection of user profile information associated with said user;
requesting access for a user to a collection of said management information for a virtual element; and
determining whether to grant said request based on said user profile information and said collection of management information,
providing a management facility facilitating a view of a first virtual element from the plurality of virtual elements to the user, the view of the first virtual element containing an embedded view of a second virtual element, the second virtual element associated with the first virtual element,
tagging the collection of management information for the first virtual element with a virtual element identifier to associate that collection of management information with the first virtual element; and
tagging the collection of management information for the second virtual element with a first virtual element identifier and a second virtual element identifier to associate that collection of management information with the first virtual element and the second virtual element, such that the collection of management information for the second virtual element is able to be viewed from the view of the first virtual element and the embedded view of the second virtual element.

11. The method of claim 10 wherein said request is contained in a CLI (Command Line Interface)-generated request, web-based request and programmatically generated request.

12. The method of claim 10, further comprising:
providing a management facility facilitating one a of a system view and virtual element view to said user based on said user profile information with said user, and system view including a view of a plurality of said virtual elements.

13. The method of claim 10 wherein said collection of user profile information defines the type of access privileges of said user.

14. The method of claim 10 wherein said collection of user profile information defines the scope of access privileges of said user.

15. The method of claim 14 wherein the scope of access privileges of the user is set to one of a specified virtual element, a subset of virtual elements and unlimited access to configuration data of any virtual element configured on said physical device.

16. The method of claim 10, further comprising:
allowing a user to access said collection of management information associated with a virtual element based on a response to the request.

17. The method of claim 10, further comprising:
denying a user access to said collection of management information associated with a virtual element based on a response to the request.

18. The method of claim 10, further comprising:
tagging each collection of management information with a virtual element identifier to associate that collection of management information with a particular virtual element.

19. The method of claim 10, further comprising:
providing a user interface, said user interface modified based on the scope and type of access privileges accorded said user.

* * * * *